Feb. 17, 1970  E. H. HARKNESS  3,495,311
METHOD OF PRODUCING ELECTRICAL CAPACITORS WITH
SEMICONDUCTOR LAYER
Filed Nov. 9, 1967

INVENTOR
ERIC H. HARKNESS

BY  *Isidore Togut*

ATTORNEY

United States Patent Office 3,495,311
Patented Feb. 17, 1970

3,495,311
METHOD OF PRODUCING ELECTRICAL CAPACITORS WITH SEMICONDUCTOR LAYER
Eric Harold Harkness, Grossweismannsdorf, Germany, assignor to International Standard Electric Corporation, New York, N.Y., a corporation of Delaware
Filed Nov. 9, 1967, Ser. No. 681,638
Claims priority, application Germany, Nov. 16, 1966, St 26,122
Int. Cl. B01j 17/00; H01g 9/00, 13/00
U.S. Cl. 29—25.41                        5 Claims

ABSTRACT OF THE DISCLOSURE

The anode of tantalum or niobium coated with a dielectric oxide layer on a semiconductive layer of manganese dioxide is subject to an anodic treatment in molten metal at a temperature higher than 150° C. with a DC-voltage not higher than the nominal DC-voltage of the capacitor.

BACKGROUND OF THE INVENTION

The invention relates to a method to produce electrical capacitors in which on a body of "valve-type" metal at first a dielectric oxide layer is produced whereupon a semiconductor layer is applied onto said oxide layer, said semiconductor layer being covered with a conductive layer.

Such capacitors are known in the literature as "solid" electrolytic capacitors," although, in contrast to the electrolytic capacitors, no eletrolytic current flow takes place.

The body of "valve-type" metal is understood in the present invention as any arbitrary form, e.g. solid bodies, sintered bodies, metal sheets, wires, etc.

The valve-type metal in such capacitors is frequently tantalum or niobium, although other metals, too, may be used as e.g. aluminum, titanium, zirconium, hafnium, etc.

When producing such a capacitor at first a dielectric oxide layer is produced onto the valve-type metal by an anodic oxidation and on said oxide layer a semiconductor layer is applied.

This semiconductor layer may be manganese dioxide, produced by a thermal decomposition of a dilution of manganese nitrate. But also other semiconductors for said layer may be used, as e.g. lead dioxide produced from lead compounds known to the art.

In order to provide a feeder lead to the semiconductor layer a conductive layer is applied onto said semiconductor layer. It is principally possible to apply a metal layer of suitable metal or of an alloy by spraying, evaporation or any other suitable manner. Because, however, these metal layers poorly adhere to the semiconductor layer at first a graphite layer is applied to said semiconductor layer upon which graphite layer the metallic layer is applied thereupon.

It has been found that the electrical properties of such capacitors are unstable, in that in the course of the time the electrical properties of the capacitor change.

This impairment of the electrical properties has different reasons and consequently, various measures have been proposed for improvement, which measures however did not lead to results desired.

For example, it has been suggested that the semiconductive oxide layer be artificially aged at a temperature of 300° C.

It is also known to remove, prior to the application of the semiconductor layer, the impurities from the oxide layer at a temperature of between 1700 and 2600° C.

The periodical "Journal of Electrochemical Society," 1963, pages 1264–1271 also describes a heat treatment of tantalum oxide layers at temperatures above 200° C. It is stated in said article that the capacity is thereby increased, but at the same time the electrical properties of the capacitor becomes more dependent on the voltage.

SUMMARY OF THE INVENTION

The present invention proposes a method to produce electrical capacitors with a semiconductor layer with the aid of which the electrical properties are stabilized, thereby maintaining the advantageous electrical properties of such capacitors. The method moreover shows the advantage that it can be performed together with the necessary production process of applying a conductive layer, so that no additional process is necessary to manufacture the capacitor.

The method according to the invention is characterized in this that the valve-type metal body provided with the dielectric oxide layer and the semiconductor layer, has to undergo an anodic treatment in molten-metal at a temperature of at least 150° C.

With the aid of this method the electrical properties of the capacitor are stabilized together with the application of a conductive layer, but the disadvantages caused by a pure heat treatment are avoided by the additional current treatment.

Although it is already known to apply a voltage during the decomposition of a manganese compound to produce a semiconductor layer of manganese dioxide, the advantages of the method according to the present invention are thereby not obtained, because the heat and the current treatment is applied only after the complete application of the semiconductor layer.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE INVENTION

Solid electrolyte niobium capacitors can be made in a similar way to solid electrolyte tantalum capacitors. The niobium metal is anodized in an electrolyte, which causes the formation of the dielectric, $Nb_2O_5$ on the surface of the metal. Manganese dioxide is then brought into contact with the $Nb_2O_5$ by the thermal decomposition of manganese nitrate, $Mn(NO_3)_2$. The cathode connection is brought about by the application of a layer of graphite followed by a layer of conductive silver and finally a layer of solder. The capacitors can then be either embedded in an epoxy resin or soldered in a hermetically sealed housing. Capacitors made by the above method when aged at 85° C. with working voltage applied, show the unwanted effect that the capacitance and dissipation factor values fall.

It was found that the capacitance of the finished capacitor was always higher than that of the formed anode and capacitance of the aged capacitor was always slightly lower than that of the formed anode. The rise and fall of capacitance varied between 10% and 50% depending upon the method of production used. In other words, it can be said that the forming process produces a capacitor with a certain capacitance. This capacitance rises during the subsequent manufacturing steps. Finally this rise of capacitance is removed by the aging process.

However, this aging process is a costly step to be included in the production of the capacitor, therefore a simpler method of obtaining the fall in capacitance was sought. The novel method of this invention was to apply a D.C. voltage across the capacitor during the tinning operation. As the temperature of the solder bath is about 180° C., much higher than the normal aging temperature of 85° C., the method could be regarded as an accelerated aging process.

Figure 1:
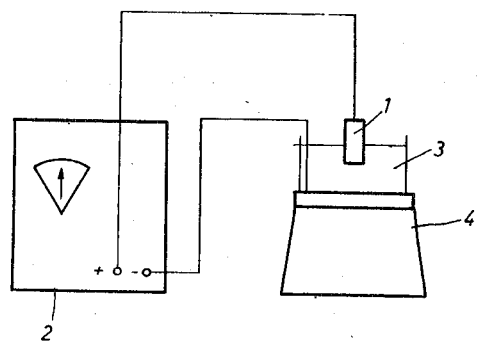
FIGURE 1 is a schematic diagram of the apparatus for producing the improved capacitor of this invention.

This was verified in an experiment. The capacitors used in the tinning experiments were from the same batch of 25 volt capacitors with an average formed capacitance of 9 μf. The capacitors were all measured before and after a normal tinning at 185° C. As shown in FIGURE 1, the capacitor 1 was then subjected to a further tinning operation, this time with an applied D.C. voltage from power supply 2 between the capacitor 1 and the tin-bath 3 which was kept in a molten state by the heating element 4. The temperature, voltage and time were varied in order to determine their relationship with the change of capacitance.

The system $Nb-Nb_2O_5$-graphite and the $Nb-Nb_2O_5$-electrolyte together with the influence of heat-treatment upon them has been previously reported. The similarities between the niobium systems compared with those of the tantalum systems have been discussed by D. M. Smyth and T. B. Tripp of the Electrochemical Society 113-(1966)1048. The basic model described therein is taken as the foundation of the theory which is to be put forward here to explain the behavior of the $Nb-Nb_2O_5-MnO_2$ structure.

It is well known that niobium oxidizes in air at temperatures above 150° C. whereas tantalum only begins to oxidize at temperatures above 260° C. It has been reported that at a given temperature the presence of an anodic film on the metal decreases the gross oxygen consumption rate, which is then dependent on the film thickness.

Figure 2:
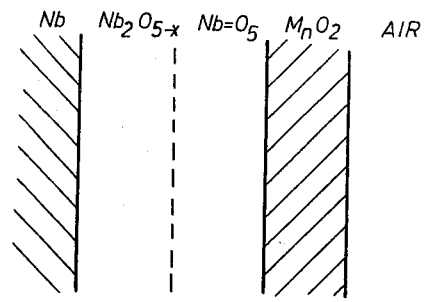
FIGURE 2 is a schematic representation of the system $Nb\text{-}Nb_2O_5\text{-}MnO_2$.

It is also a fact, that manganese dioxide acts as a carrier of oxygen. For example, manganese dioxide is much used for the hardening of oils in siccatives, its transporting property being used to activate oxygen from the atmosphere and carrying it to the unsaturated fatty acids thereby accelerating the hardening process. Using these facts together with the proposed model in FIG. 2 we can explain the changing capacitance and dissipation factor as follows:

After the formation of the oxide, it is assumed that the layer is totally composed of niobium pentoxide, $Nb_2O_5$, the complete layer acting as dielectric. During the decomposition of the manganese nitrate to manganese dioxide the whole system is heated up to temperatures between 150° C. and 300° C. Because of the affinity of niobium for oxygen at this temperature oxygen ions will be drawn from the region next to the metal. The diffusion through the $Nb_2O_5$ of oxygen ions from the manganese dioxide will attempt to replace these deficiencies. However, this diffusion rate is not so great as to completely replace the vacancies and an equilibrium condition will be set up in which an intermediate layer of oxide with oxygen vacancies exists next to the niobium metal. When the system is returned to room temperature, the flow of oxygen ions stops and the intermediate layer is frozen in situ. In this "oxygen vacancy" region the vacancies can be regarded as donor centers. Therefore this region will exhibit n-type semiconductivity. Because of this the thickness of the effective dielectric will be reduced, giving rise to an increase in capacitance and dissipation factor (the semi-conducting region acting as an extra resistance in series with the capacitance).

If a D.C. voltage is now applied to this system at a high temperature then the following can take place:

(1) The oxygen ions near the niobium-niobium oxide interfaces will be drawn into the metal as above.

(2) Oxygen ions supplied by the $MnO_2$ will be accelerated by the applied voltage field through the oxide and fill up to vacancies left by action 1.

The excess of oxygen ions supplied by action 2 does not affect the rate of reaction 1 which takes place according to Arrhenius' Law.

If the temperature and the voltage can be adjusted so that the diffusion rate of action 2 is higher than that of action 1, then the result will be that the region of oxygen vacancies will be reduced. Upon cooling and freezing in of this condition, the capacitance and dissipation factor will have fallen towards their original values. Furthermore, if the time of the application of voltage at temperature is sufficiently long enough for equilibrium to be reached then the capacitance and dissipation factor will fall to their original values.

The first result considered was the connection between the fall in capacitance during life-test and that which occurs when the capacitance is measured with an applied D.C. bias voltage. The fall in capacitance due to the bias voltage before the life-test indicates the existence of an intermediate layer. The voltage field draws the conduction electrons (at room temperature electrons are the predominant current carrier) in the intermediate zone towards the metal increasing the effective width of the dielectric thereby decreasing the capacitance and dissipation factor. After 80 hours life-test the capacitance has fallen and now the application of a bias voltage has very little effect indicating that the intermediate layer has now practically disappeared.

A typical behavior of the capacitors when tinned with and without voltage is given in table 1 below:

TABLE 1

| Before tinning | | After tinning | | After tinning with voltage | |
|---|---|---|---|---|---|
| C | tan δ | C | tan δ | C | tan δ |
| 10,57 μF | 5,2% | 10,21 μF | 4,6% | 8,01 μF | 1,3% |

It was found that the optimum conditions necessary to obtain practically the same fall in capacitance which takes place during the life-test are a temperature of 185° C., an applied voltage of 15 v. (20 v. being too near the breakdown point) and a time of 5–6 minutes.

It was also found that when the temperature rises from 195° C. to 230° C. the diffusion rate of the ions from the oxide to the metal increases fourteen fold. This amount of increase is to be expected as the general formula for the temperature dependence of diffusivity is of the type $D=D_0 \exp(-E/kT)$.

The explanation for the fact that the capacitance did not increase during this tinning operation, is as follows: the capacitance will have risen during the manganizing. However, the reforming is carried out at room temperature with a reforming voltage only half that of the forming voltage.

The results of the experiments carried out have supported the proposed theoretical explanation of the effect which takes place when a niobium capacitor is operated at high temperatures with an applied D.C. voltage. The method of applying a D.C. voltage during the tinning operation in the production of niobium capacitors is now in use. Preliminary experiments with tantalum and aluminum solid electrolyte capacitors have shown similar effects; the effect with tantalum, however, is not so pronounced.

With the method according to the invention the semiconductor layer can be applied of course in several partial layers, as known, eventually with a carried out improvement of the anodic oxide layer in between those partial applications.

All metals and alloys may be used as metal melt which are suitable to produce a metal layer for the capacitor as a conductor lead, the melting point of which is not higher than the temperature provided for the treatment. The melting point of the metal or of the alloy used will normally be below 150° C.

It is known to produce the metallic conductive feeder layer in capacitors with semiconductor layers of lead-tin alloys (U.S. Patent 3,100,329) or of metals such as copper, silver or nickel.

In the method according to the invention the capacitor, provided with a dielectric oxide layer and a semiconductor layer is dipped into a metal melt and a voltage is applied to the valve-type metal body and to the melted metal which approximatley corresponds to the nominal DC-voltage of the capacitor.

Thereby the capacitor plays the role of the anode.

It revealed that, when using niobium as value-type metal, the inventive method can be advantageously performed at a temperature of between 170 and 190° C.

For an improved adhesion of a metal layer, formed by the material of the melt, it is advantageous at first, to apply a graphite layer onto the semiconductor layer and to apply to the graphite layer a layer of conductive silver, before the anodic treatment in the metal melt is carried out.

Normally the advantages of the method according to the invention are obtained already during a rather short treatment. In many cases it is sufficient to carry out the treatment for five minutes.

When removing the capacitor body out of the metal melt a layer of the material remains on the body of the capacitor, forming the feeder lead to the semiconductor layer. A feeder or terminal wire can then be soldered onto said layer.

During the treatment according to the invention not only are the electrical properties stabilized, but they are partly improved. For example, the capacity and the residual current is brought to improved values without making these values more dependable on the voltage.

The method according to the invention can be applied for all capacitors with a semiconductor layer, but is particularly suitable for capacitors having tantalum and niobium as valve-type metal.

While I have described above the principles of my invention in connection with specific apparatus, it is to be clearly understood that this description is made only by way of example and not as a limitation to the scope of my invention as set forth in the objects thereof and in the accompanying claims.

I claim:

1. The method of producing electrical capacitors wherein a body of valve-type metal from the group consisting of tantalum, niobium, aluminum, titanium, zirconium and hafnium is provided with a dielectric oxide layer, onto which oxide layer a semiconductor layer is applied which is covered by a conductive layer, the improvement comprising dipping the valve-type metal body, covered with the dielectric oxide layer and with the semiconductor layer into a metal melt heated to a temperature of at least 150° C., applying a voltage to said metal body and said melt and withdrawing said body after a time sufficient to stabilize the electrical characteristics of said body.

2. Method according to claim 1, wherein the treatment is performed with the nominal DC-voltage of the capacitor.

3. The method according to claim 1, wherein niobium is the valve-type metal and the temperature is maintained between 170 and 190° C.

4. The method according to claim 1 comprising the further steps of applying a graphite layer onto the semiconductor layer, and then applying a conductive silver layer onto said graphite layer before dipping the metal body into the metal melt.

5. The method according to claim 1, wherein a layer of the material of the melt remains on the capacitor body as a metallic lead.

References Cited

UNITED STATES PATENTS

| | | | |
|---|---|---|---|
| 2,731,706 | 1/1956 | Grouse | 29—25.42 |
| 3,073,943 | 1/1963 | Girling | 29—25.41 X |
| 3,279,030 | 10/1966 | Wagner | 29—25.42 X |
| 3,284,684 | 11/1966 | Gaenge | 29—25.42 X |
| 3,292,053 | 12/1966 | Giacomo | 29—25.41 X |
| 3,305,914 | 2/1967 | Raue | 29—25.42 |
| 3,337,429 | 8/1967 | Zind | 29—570 X |
| 3,345,543 | 10/1967 | Sato | 29—570 X |

FOREIGN PATENTS 742,379 12/1955 Great Britain.

WAYNE A. MORSE, JR., Primary Examiner

U.S. Cl. X.R.

29—570